May 17, 1927.
J. W. DENMEAD
PIE ROLLING MACHINE
Filed May 19, 1926
1,628,828
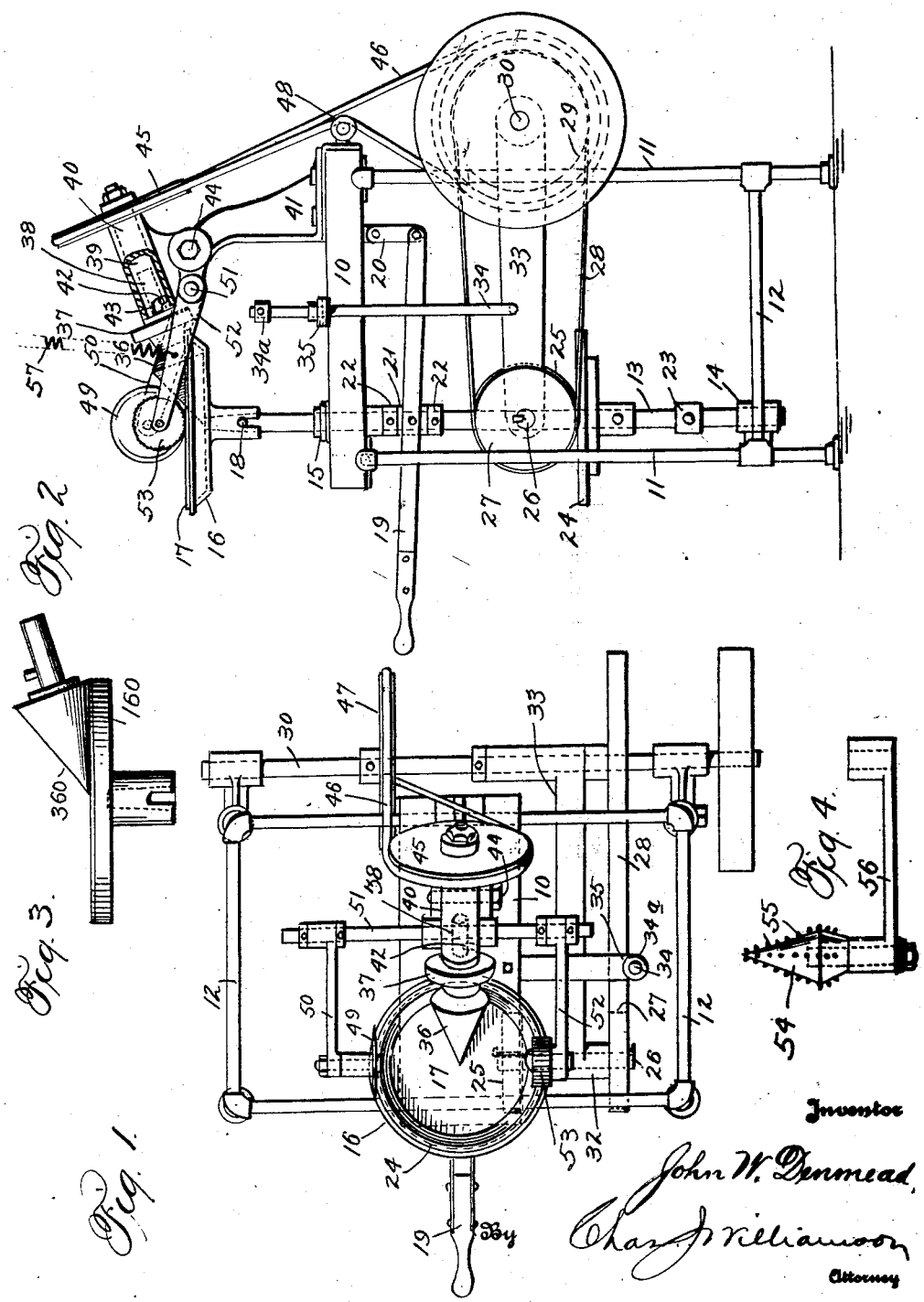

Patented May 17, 1927.

1,628,828

UNITED STATES PATENT OFFICE.

JOHN W. DENMEAD, OF AKRON, OHIO, ASSIGNOR OF ONE-HALF TO WILLIAM A. JOHNSTON, OF AKRON, OHIO.

PIE-ROLLING MACHINE.

Application filed May 19, 1926. Serial No. 110,243.

The object of my invention, primarily, is to enable the manufacture of pastry, such as pies which include a cup-shaped bottom crust, and a more or less flat top crust by the use of a machine, so that all or practically all of the operations may be performed mechanically or automatically, and thus by reason of a great increase of output over hand work, the cost of manufacture may be greatly reduced, and at the same time the operation be performed with less labor, and performed with even greater efficiency in regard to quality of product than can ordinarily be done by hand work, which may not be of the highest skill. My invention consists in a machine having a construction as defined by or included within the scope of the appended claims.

In the drawings:

Fig. 1 is a top plan view of a machine embodying my invention adapted for making pies having a dished bottom crust and a flat top crust;

Fig. 2 is a side elevation thereof;

Fig. 3 is a detail view in side elevation of the devices for rolling or forming the flat top crust;

Fig. 4 is a detail view of an attachment which may be used in case the crust requires to be perforated.

Briefly described, the machine shown in the drawings, starting with a ball or lump of dough sufficient to form the crust, performs the operations of giving shape to the crust, that shape being dish form for the bottom crust and disc form for the top crust, the trimming of the edge of the crust at the top to remove surplus dough, and crimping the rim of the crust at the top. A simple substitution of parts, as hereinafter fully explained is required for the production of the bottom and top crusts, and for perforating the crusts, when that may be necessary.

The frame-work of the machine comprises a horizontal table or plate, 10, which is supported at a suitable height by legs, 11, connected and braced by horizontal members, 12, the legs and the brace members being conveniently made of pipes or tubing. Towards the front of the machine and at the center thereof is a vertical shaft, 13, that extends from a bearing, 14, near the bottom of the frame-work through a bearing, 15, on the table, and above the latter, and at its upper end removably carries a circular holder for the dough which is to be shaped into crust, and is either the dish-form holder, 16, adapted to receive a pie plate or dish, 17 (see Fig. 1), for forming the bottom crust of the pie, or the flat disc form holder, 160, (see Fig. 3) when the top crust is to be formed, these holders being interchangeable. For ready interchangeability, each holder has on its underside a hub with an axial hole that fits the tapered upper end of the shaft. To form a positive rotating connection between the shaft and holder, the shaft has a radial pin, 18, for engagement by a downwardly opening slot in the lower end of the holder hub. The shaft, 13, is both rotatable and longitudinally movable. The longitudinal or vertical movement of the shaft is for the purpose of moving the dough holder into and out of cooperative relation with the crust-forming instrumentalities (hereinafter described), so that when lowered the dough may conveniently be placed in the plate or holder, and the finished crust removed, and at the same time place the shaft in or out of driving connection with the shaft rotating means. For raising the shaft to place the dough holder in and holding it in its raised position, I provide a hand lever, 19, which extends conveniently at the front of the machine from a link, 20, hung to the machine table to which link the rear end of the lever is pivoted, and between its ends the handle is pivotally attached to a collar, 21, in which the shaft turns, which is fixed against longitudinal movement of the shaft by set collars, 22, above and below the same. The upper set collar, 22, forms a stop to limit the upward movement of the shaft by engaging the upper end of the upper shaft bearing, 15. A collar, 23, secured to the shaft near the lower end forms a stop to limit the descent of the shaft by engaging the upper end of the lower shaft bearing, 14.

Secured to the shaft, 13, is a horizontal disc, 24, which is the driven member of a friction drive, the drive member being a disc, 25, keyed to one end of a shaft, 26, to the other end of which is keyed a pulley, 27, which by a belt, 28, is drivingly connected with a drive pulley, 29, on the drive shaft, 30, which has a driving pulley, 31. The shaft, 26, is journaled to revolve in a bearing, 32, at the end of an arm, 33, which is pivoted to swing on the drive shaft, 30, so that the friction gear drive disc may rest with the desired pressure upon the driven disc. When the holder carrying shaft, 13, is at its lowest position, the driver disc is out of contact with the driving disc and when said shaft is moved vertically, the driver disc is brought into contact with the driving disc, and the two move upward together for the remainder of the lifting movement of said shaft, 13, and thus is assured proper driving contact of the members of the friction drive. To limit the descent of the driver disc, and thus assure the disconnection of the friction drive when the rotation of the shaft, 13, and the holder is to cease, there is connected to the swinging arm, 33, a vertically extending rod which passes upwardly above the table which has a collar, 34ª, fixed to it, which when the shaft, 13, is at its highest position is spaced above a guide, 35, for said rod which is secured to the table and in contact with the top of said guide, said stop collar, 34, comes when the desired limit of descent of the driving disc of the friction drive is reached.

For rolling the dough in or on the holder to produce the crust of the desired shape and thickness, I use a roller which is of the proper contour according as bottom crust or top crust is to be rolled. Thus, for rolling bottom crust, the roller, 36, as shown in Figs. 1 and 2 has a conical portion whose apex reaches to the center of the holder, and whose base reaches to the outwardly flared rim of the pie plate, so as to roll, and give shape to the bottom portion of bottom crust, and joining the base of said conical portion, is a frusto-conical portion whose sides slant at the angle of the flange rim of the pie plate, and have an extent to reach just above the top. At a point situated just outside the rim of the bottom crust holder, said roller has a flange or collar, 37, from which projects outwardly a stub shaft or gudgeon, 38, which enters a tubular shaft or mandrel, 39, journaled at an incline in a bearing, 40, supported by a bracket, 41, mounted on the table top. The roller is detachably connected with the mandrel as by means of a radial pin, 42, on the stub shaft, and a bayonet slot, 43, at the end of the mandrel. Thus, the roller may be easily applied and removed, so that there may be interchange with the simple conical roller, 360, which has a stub shaft and radial pin for cooperation with the hollow mandrel. To enable the careful adjustment of the angle of the mandrel bearing, 40, so as to have the roller in accurate relation with the dough holder, said bearing has a pivotal connection with the bracket, 41, which pivotal connection comprises a clamp bolt, 44, which will secure the bearing in the position to which it may be adjusted. For revolving the crust forming roller to cause it to properly roll the dough, the mandrel has on its rear end a grooved pulley, 45, which is connected by a round belt, 46, with a driving pulley, 47, on the driving shaft. One run of the belt passes over an idler pulley, 48, secured to the back of the table top.

For trimming off the edge of surplus crust, and making a neat rounded finish, I provide a knife, 49, preferably of disc form which is carried at the end of an arm, 50, which is pivoted to rise and fall so that the knife will rest with sufficient pressure upon the crust edge just within the edge of the rotary holder to trim off the desired quantity of the pie crust edge. Said arm, 50, is pivoted on a rod or stationary shaft 51, which passes through a hole in the part which carries the mandrel bearing, 40, and is fixed thereto as by bolts or screws. And said shaft, 51, is projected far enough on the opposite side to receive and pivotally support an arm, 52, which at its outer end pivotally supports a crust crimping disc, 53, said disc having for the purpose a milled or corrugated periphery, and which rests freely upon the top edge of the pie crust as the latter revolves, and thereby produce the desired crimps.

It is sometimes desirable to perforate the bottom crust to provide small holes to let out air during baking to avoid blistering the crust. I provide for that purpose the roller, 54, shown in Fig. 4 that has the same contour as the roller for forming the bottom crust, but upon its periphery has one or more rows of sharp spurs, 55, which will penetrate and perforate the crust during the crust forming operation. Said roller, 54, is carried by an arm, 56, so that by removing the crimping disc with its arm from the shaft, 51, the perforating roller carrying arm, 56, may be applied to said shaft.

It will be seen that by the use of the machine embodying my invention, the bottom and top crusts can be very easily and rapidly made, so that no hand work or manipulation is required, except in placing the top crust after the filling has been placed in the bottom crust. The machine can be used with the bottom crust forming roller, until the bottom crusts for a number of pies have been made, and then the necessary simple substitution of parts may be made to make top crusts for a quantity of pies. Then each bottom crust being provided with its filling, the pan or dish containing the same can be replaced in the machine with the top crust applied, and then the machine will perform the trimming and crimping operations on the top crust.

It is to be understood that those features of my invention which render it applicable to forming or shaping articles other than pie crust are considered to be within the scope of the following claims, which do not have limitations or a meaning that excludes machines for making other articles. The adhesive or sticky nature of dough makes the frictional engagement of the dough with the roller a factor or means of imparting rotation to the roller, and my invention may be embodied in machines in which the belt drive for the conical roller may be omitted.

As shown in Fig. 2 a light coil spring, 57, is attached at its lower end to the lever, 52, and at its upper end to some overhead point to hold the crimper in a raised position, except when it is pressed by hand down against the dough. And if desired a similar spring may be attached to the trimmer knife lever, 50. It will be understood that when the knife, 49, is pressed through the dough into contact with the rim of the holder, 16, the friction of the latter will revolve the knife.

What I claim is:

1. A machine for shaping material, such as dough, comprising two coacting rotary members, each having its rotating means, and a movable support for one of such members for bringing them together in working relation and separating them, one of such members having a material-engaging surface that extends substantially from the center of rotation of the other rotary member radially outward and is adapted to have contact with the material as the two members rotate, whereby a thin disc is formed.

2. A machine for shaping material, such as dough, comprising two coacting rotary members, each having its rotating means, and a movable support for one of such members for bringing them together in working relation and separating them, the rotating means of the member movable as described being rendered inactive when the members are separated, one of such members having a material-engaging surface that extends substantially from the center of rotation of the other rotary member radially outward and is adapted to have contact with the material as the two members rotate, whereby a thin disc is formed.

3. A machine for shaping material, such as dough, comprising two coacting rotary members, a vertically movable shaft for one of such members, means for rotating said shaft comprising gearing that is engaged and disengaged by the opposite vertical movements of said shaft, and manual means for controlling the vertical movement of said shaft.

4. A machine for shaping material, such as dough, comprising two coacting rotary members, each having its rotating means, and a movable support for one of such members for bringing them together in working relation and separating them, both of said members being parts of sets that are interchangeable whereby at different times different parts may be cooperatively used.

5. A machine for forming material, such as dough, comprising cooperating rotating members, a vertical shaft for one of said members, means for moving said shaft vertically, a friction disc on said shaft, a cooperating driving disc, a vertically movable support for said driving disc, and means to limit the vertical movement of said driving disc.

6. A machine for forming material, such as dough, comprising a rotary holder and a cooperating former having a material-engaging surface that extends substantially from the center of motion of the rotary holder and radially outward, means for supporting such former in a position relative to which the holder rotates, whereby by the rotation of the holder the material is progressively brought into contact with the former, and a tool acting on the material on the holder situated at the rim of the holder.

7. A machine for forming material such as dough, comprising a rotary holder and a cooperating former having a material-engaging surface that extends substantially from the center of motion of the rotary holder and radially outward, means for supporting such former in a position relative to which the holder rotates, whereby by the rotation of the holder the material is progressively brought into contact with the former, and two tools situated to act upon material on the former at the rim thereof, one of such tools being a knife.

8. A machine for forming material, such as dough, comprising a rotary holder and a cooperating former, a tool acting on the material on the holder situated at the rim of the holder, and a vertically swinging arm carrying said tool.

9. A machine for forming material, such as dough, comprising a rotary holder and a cooperating former two tools, situated to act upon material on the former at the rim thereof, one of such tools being a knife, and vertically swinging arms carrying said tools.

10. The combination of a frame-work, a vertical shaft journaled in bearings on said frame-work, said shaft being vertically movable, a removable holder at the upper end of said shaft, means on the shaft to limit its vertical movement in both directions, a mandrel mounted in a bearing on said frame-work, a rotary former removably connected with said mandrel, a main driving shaft, a driving connection between said shaft and said mandrel an arm hung on said shaft, a driving disc carried by said arm, a driving connection between said disc and said shaft, a driver disc with which said first mentioned driving disc cooperates, and means to limit the downward swing of said arm.

11. A machine for shaping material, such as dough, comprising two co-acting rotary members, one of said members being a conical roller and means supporting said roller with its small end substantially at the center of rotation of the other rotary member, and with its side extending radially outward whereby a flat disc is formed from the material being operated on.

12. A machine for shaping material, such as dough, comprising two co-acting rotary members, one of said members being a conical roller, and the other being a disc and means supporting said roller with its small end substantially at the center of rotation of the other rotary member and with its side extending radially outward whereby a flat disc is formed from the material being operated on.

13. A machine for shaping material, such as dough, comprising two co-acting rotating members, one of said members having a shape to conform with the article, and the other member being a support for a former in which the article is formed and means for maintaining one of such members in a fixed position with reference to the other as the latter rotates.

14. A machine for shaping material, such as dough, comprising two co-acting rotary members, one being cone-shape, and the other being a support for a dish such as pies are made in and means for supporting the cone-shaped member with its small end substantially at the center of rotation of the other member with its side extending therefrom radially outward and adapted to contact with the material carried by said support.

15. A machine for shaping material, such as dough, comprising two co-acting members, one of said members being a conical shape and the other member disc shape, means for supporting the conical member with its small end substantially at the center of rotation of the disc-shaped member with its side extending radially outward to the rim of the disc, and means for moving one of said members to place them closer or farther apart.

16. A machine for shaping material, such as dough, comprising two co-acting members, one being a conical shape, and which rotates, and the other a holder for supporting a form for the article to be shaped which is of disc form and also rotates, said conical member being supported in a fixed position with reference to the other member and with its smaller end extending substantially from the center of rotation of the other member outward.

In testimony whereof I hereunto affix my signature.

JOHN W. DENMEAD.